United States Patent [19]

Loeffler et al.

[11] 4,293,358

[45] Oct. 6, 1981

[54] METHOD AND APPARATUS FOR ACCURATELY POSITIONING A BEAD BUNDLE

[75] Inventors: Earl F. Loeffler, Uniontown; Harley P. Weyand, Jr., Doylestown, both of Ohio

[73] Assignee: The Firestone Tire & Rubber Company, Akron, Ohio

[21] Appl. No.: 147,669

[22] Filed: May 7, 1980

[51] Int. Cl.³ .................................................. B29H 17/22
[52] U.S. Cl. .................................... 156/131; 156/403
[58] Field of Search ............... 156/126, 131, 132, 398, 156/403, 414–420

[56] References Cited

U.S. PATENT DOCUMENTS

| | | | |
|---|---|---|---|
| 3,721,600 | 3/1973 | Cantarutti | 156/131 |
| 3,944,456 | 3/1976 | Cantarutti | 156/132 |
| 4,120,714 | 10/1978 | Colombani | 156/131 |
| 4,148,680 | 4/1979 | Harding | 156/131 |
| 4,190,482 | 2/1980 | Yabe | 156/131 |

Primary Examiner—John E. Kittle

[57] ABSTRACT

A bead bundle positioning mechanism is provided to accurately locate one axial surface of each bead bundle prior to radial expansion of the tire carcass. Each bundle (62) is held by a plurality of circumferentially spaced clamping mechanisms (10) each of which has a pair of clamping elements (40,48) respectively engaging the axially inner (68) and axially outer (72) surfaces of the bead bundle (62). The axially inner surface (68) of each bead bundle (62) is located by respective clamp members (40,48) which are adapted to cooperate with a tire building machine to provide a predetermined axial distance between the bead bundles during tire assembly while also maintaining the inner axial surfaces in parallel planes which are normal to the longitudinal axis (15) of the tire building drum (74). The inner and outer clamping elements (40,48) are actuated by independent fluid motors (34,36). The clamping force exerted by the axially inner clamping element (40) is greater than the clamping force exerted by the axially outer clamping element (48), to insure that the axially inner surface (68) of the bead bundle (62) is the referenced positioning surface. The inner clamping element (40) interacts with a stop member (42) to establish a predetermined position for the axially inner surface (68) of the bead bundle (62).

10 Claims, 4 Drawing Figures

METHOD AND APPARATUS FOR ACCURATELY POSITIONING A BEAD BUNDLE

TECHNICAL FIELD

The present invention relates to a method and apparatus for accurately positioning a bead bundle with respect to the other components of what will become a pneumatic vehicular tire.

When making bias ply tires, the shaping thereof involves a certain amount of repositioning of the reinforcing strands in the body ply, which pantograph in changing from the cylindrical configuration of the green or uncured tire band to the ultimate toroidal shape of the finished tire. At the same time the body ply reinforcing strands may reposition about the bead assembly.

During the shaping of a radial tire, most of which occurs at an intermediate stage of the building process and before all the components are assembled, the relative position of the bead ring assembly with respect to the reinforcing strands in the body plies must remain fixed during the shaping operation. Hence, any inaccuracy in the placement of the bead bundle will reflect on the quality of the finished tire.

For example, if the bead bundles are oriented askew with respect to the cylindrical configuration of the body plies, the outer periphery of the body plies—after having been shaped to the toroidal configuration—may not be perfectly concentric with the bead rings. This condition is termed radial run-out.

Such misplacement of the bead bundles may also cause the equatorial centerline of the toroidally shaped body plies to misregister with that of the circumferential belts subsequently positioned about the periphery. If the centerlines assume a serpentine orientation with respect to each other the resulting condition is termed lateral runout. If the centerlines assume a lateral displacement, the condition is termed conicity.

Leading to the development of the subject invention was the understanding that one of the most critical dimensions to be maintained when fabricating a tire, and particularly a radial tire, is the span of the body ply members between the opposedly inwardly facing surfaces of the bead bundles. Maintaining the accuracy of this dimension improves radial run-out and establishes the initial conditions necessary to obviate lateral run-out and conicity. In addition, accuracy in establishing this dimension helps maintain the desired crown angle and end count.

BACKGROUND ART

Pursuant to the prior art, positioning of the bead bundle has generally been accomplished by locating the axially outer surface of the bead bundle with a clamp or shoulder prior to, or simultaneous with, the placing of the bead bundle on the cylindrical assemblage of the body ply members. However, the linear dimension between the axially inner surfaces of the opposing bead bundles is the determining factor as to the ultimate position of the bead relative to the centerline of the tire bead. Thus, when the axially outer surface of the bead bundle is accurately positioned, the dimensional tolerances experienced with the width of the bead bundle itself becomes a limiting factor in the accuracy with which the bead bundle is positioned.

DISCLOSURE OF THE INVENTION

It is, therefore, a primary object of the present invention to provide an improved bead positioning mechanism wherein the axially inner surface of each bead bundle is accurately positioned.

It is another object of the present invention to provide an improved bead bundle positioning mechanism, as above, wherein the bead bundle is clamped between axially inner and axially outer surfaces and wherein the axially inner clamping element is positioned against a referenced stop member by a force which is of greater magnitude than the force exerted by the outer clamping element.

It is a further object of the present invention to provide an improved bead bundle positioning mechanism, as above, wherein the bead bundle can be positioned to maintain a predetermined linear dimension from its axially inner surface to that of the opposed bead bundle and the centerline of the carcass; and also to maintain the axially inner surface of each bead bundle in a plane perpendicular to the longitudinal axis of the cylindrical body ply assembly as it is expanded into locking engagement with the radially inner portion of the bead bundle.

It is a still further object of the present invention to provide a method for accurately engaging and positioning bead bundles, as stated hereinabove.

These and other objects, together with the advantages thereof over existing and prior art forms which will become apparent from the following specification, are accomplished by means hereinafter described and claimed.

In general, the present invention provides a mechanism which will permit accurate positioning of the bead bundles with respect to the cylindrical assemblage of the body ply members in a green tire band, and will maintain the bead bundle so positioned accurately until it is firmly clamped by the body ply assembly as a result of its radial expansion. This mechanism preferably includes a clamp structure which is secured to the frame of the tire building machine—e.g., a headstock structure at one end of the drum assembly and a tailstock at the other end. The clamp engages the axially inner and axially outer surfaces of each bead bundle. Inasmuch as the clamping mechanism associated with the tailstock is identical to that associated with the headstock, only the latter need be described. The inner clamping element, which abuts the axially inner surface of the bead bundle, is positioned by an actuating force of greater magnitude than that which acts on the outer clamping element, i.e., the actuating force on the inner clamping element maintaining the bead bundle in the desired, predetermined position will override the actuating force on the outer clamping element attempting to move the bead bundle. The inner clamping element engages a predetermined reference, or stop, surface so that irrespective of any dimensional tolerances in the bead bundle the axially inner surface of the bead bundle is accurately positioned with respect to a predetermined frame of reference. Both bead bundles are thus positioned on the cylindrical green tire band at predetermined locations to insure that the dimension between the axially inner surfaces of the bead bundles is neither more nor less than desired. A plurality of these clamping mechanisms, circumferentially spaced, insure that the inner axial surface of each bead bundle is maintained in a plane perpendicular to the longitudinal centerline of the cylindrical tire band. So positioned, the body ply assembly expands radially to secure it firmly against the radially inner surface of the bead bundles, thus fixing the location of the bead bundles vis-a-vis the body ply members. Thereupon, the clamping mechanism can be released, and the tire building proceeds in a known manner.

One preferred embodiment is shown by way of example in the accompanying drawings and described in detail without attempting to show all of the various forms and modifications in which the invention might be embodied; the invention being measured by the appended claims and not the details of the specification.

PREFERRED MODE FOR CARRYING OUT THE INVENTION

Figure 1:
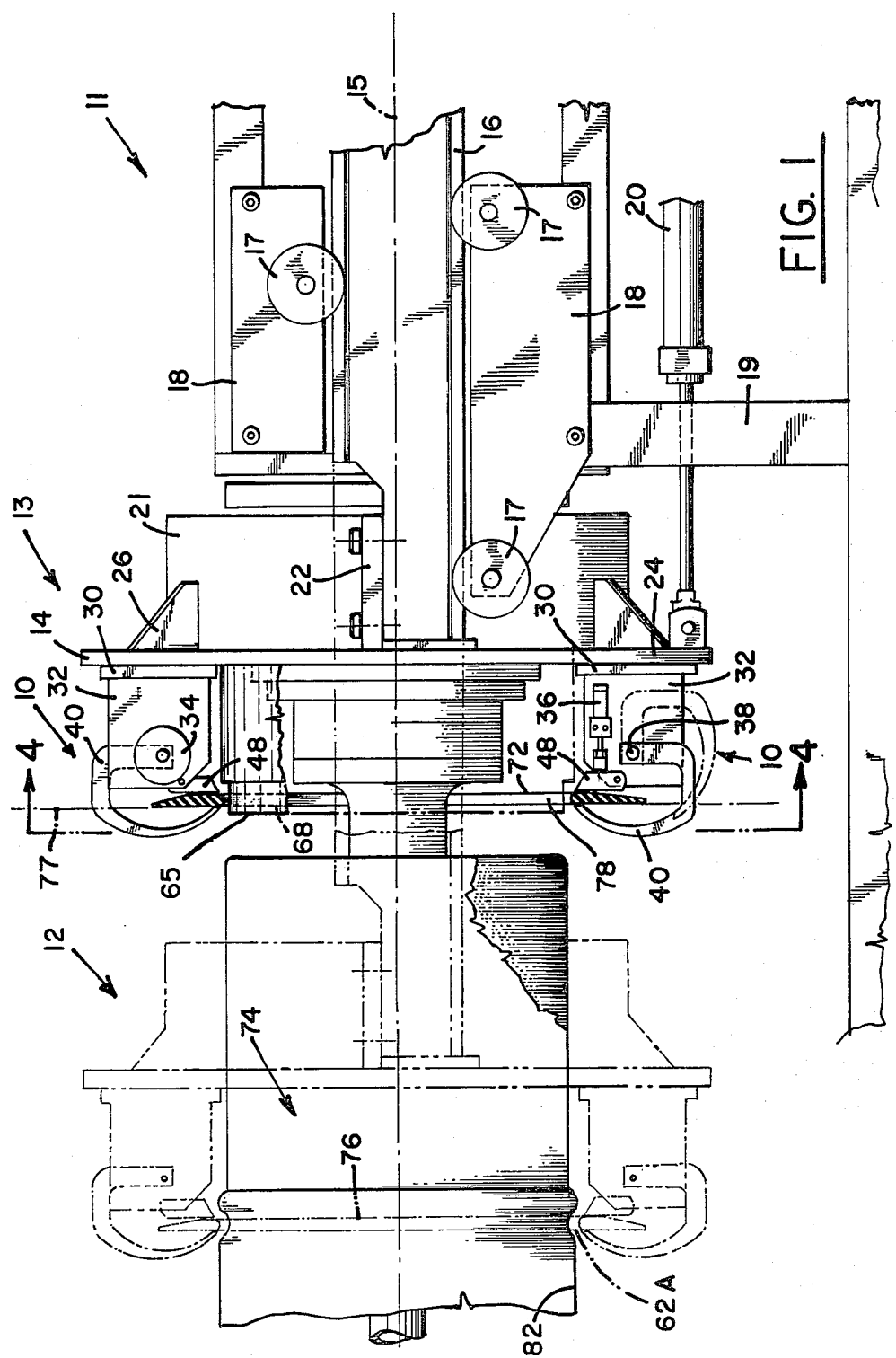
FIG. 1 is a side elevational view of a portion of a tire building machine incorporating bead bundle positioning mechanisms embodying the concept of the present invention.
Figure 3:
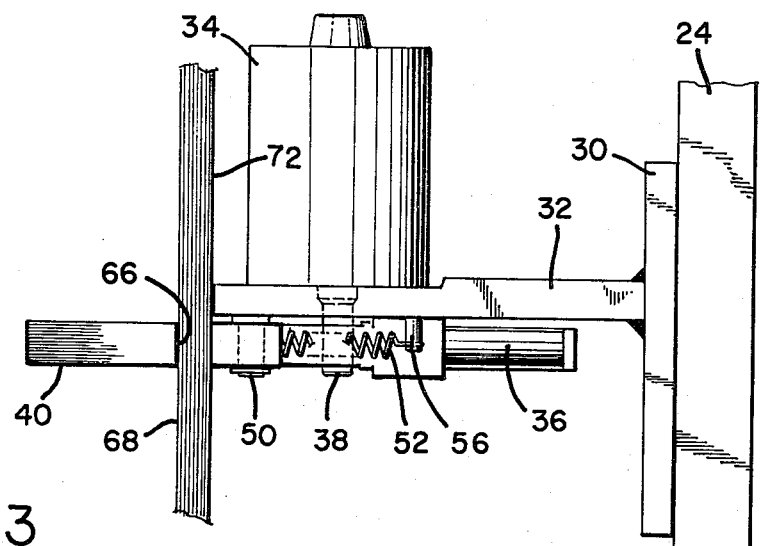
FIG. 3 is a top view of the mechanism shown in FIG. 2.

A bead clamping mechanism, designated generally by the numeral 10, is depicted in FIG. 1 operatively associated with the headstock 11 of a tire building machine 12 of the type more fully disclosed in copending U.S. Application Ser. No. 147,668, filed on May 7, 1980, and owned by the assignee of record herein. The present bead clamping mechanism 10 is, however, readily adaptable for use with a wide variety of tire building machines in addition to that disclosed in said application.

The bead clamping mechanism is generally carried by a platen assembly 13, which includes an annular plate 14 adapted to be guided along the longitudinal axis 15 of the headstock 11 by a pair of rails 16 riding on a plurality of rollers 17 which are rotatably supported on plates 18 secured to a stationary frame 19 of the headstock 11. The annular plate 14 can be reciprocated along longitudinal axis 15 by any well-known mechanism such as pneumatic motor, gear drive or the hydraulic cylinder 20 depicted. The platen assembly 13 has a cylindrical body portion 21 secured to the rails 16 by a pair of mounting flanges 22 that extend diametrically outwardly from the body portion 21. The annular plate 14 is secured to the cylindrical body portion 21 and is stabilized by a plurality of fillet plates 26 which are rigidly fixed between the cylindrical body portion 21 and the annular plate 14. The annular plate 14 supports a plurality of circumferentially spaced clamping mechanisms 10. The clamping mechanisms 10 are presented from a mounting plate 30 which is secured, as by fasteners 31, to the annular plate 14. A clamp supporting plate 32 is, in turn, secured to, and extends perpendicularly outwardly from, the mounting plate 30.

The clamp supporting plate 32 carries a rotary fluid motor 34 and a linear fluid motor 36. These motors 34 and 36 are connected to a conventional power source in any well-known manner which will permit selective operation. Although fluid motors are disclosed, those skilled in the art will appreciate that a wide variety of actuating means may be employed.

Figure 2:
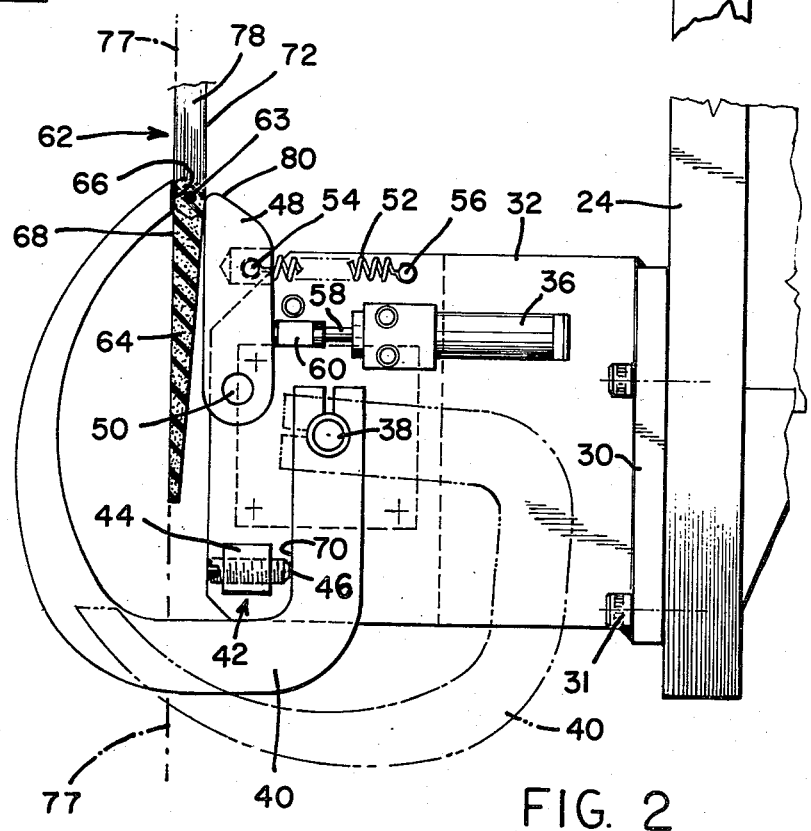
FIG. 2 is a side elevational view of a clamping mechanism for a bead bundle positioning mechanism.

The rotary fluid motor 34 has an output shaft 38 which has secured thereto, for rotation therewith, an inner clamping element 40. The inner clamping element 40 is generally U-shaped, as seen in FIG. 2, and is rotated by motor 34 between the solid-line contact or engagement position and the phantom-line, release position, as shown in FIG. 2. The solid-line position shown in FIG. 2 may also be designated as the actuated, or operating, position of the inner clamping element 40. The inner clamping element 40 is located and maintained in the operating position against a position stop indicated by the reference number 42, which stop consists of a threaded block 44 secured to the clamp supporting plate 32 and receiving a set screw 46. The set screw can be adjusted to predetermine the operating position of the inner clamping element 40, as desired.

An outer clamping element 48 is of generally bar-shaped configuration and is pivotally mounted on the clamp supporting plate 32, as by a pin 50. The outer clamping element 48, as viewed in FIG. 2, is urged in a clockwise direction by a tension spring 52 which is connected between a pin 54 on clamping element 48 and a pin 56 on the clamp supporting plate 32.

The linear fluid motor 36 has an extensible rod 58 which has an enlarged head 60 adapted to abut the outer clamping element 48. When the linear motor is actuated the enlarged head member 60 will cause the outer clamping element 48 to pivot counterclockwise about pin 50.

The inner clamping element 40 and outer clamping element 48 are adapted to engage and hold a tire bead bundle 62. The bead bundle may comprise an inextensible metallic bead ring 63 and a bead filler 64 preassembled into the annular disc configuration depicted in the drawings.

The bead bundle 62 may be manually placed on a primary locating arbor 65 supported from the frame 19. The primary locating arbor 65 is stationary relative to the platen assembly 13 and annular plate 14, and does not move along longitudinal axis 15 of the headstock when the annular plate 14 is moved longitudinally to the bead bundle setting position shown in phantom at 62A. The primary locating arbor 65 provides the operator with a means for placing the bead bundle 62 on the tire building machine 12 prior to actuation of the clamping mechanism 10, and in preparation for placing it about, or encircling, the tire building drum.

When the clamping mechanism 10 is operated, the fluid motor 34 will rotate the inner clamping element 40 so that the flat gripping surface 66 thereof engages the axially inner surface 68 of the bead bundle 62. The clamping element 40 will continue to rotate clockwise until the stop 42 is engaged by the datum surface 70 on clamping element 40. With the datum surface 70 engaging the stop 42 the gripping surface 66 is accurately located at the locus desired for the axially inner surface 68 of the bead bundle 62.

Simultaneous with, or subsequent to, the operation of rotary fluid motor 34, the linear fluid motor 36 is operated. Upon operation of motor 36, the outer clamping element 48 is engaged by rod 58 and pivoted counterclockwise into engagement with the axially outer surface 72 of bead bundle 62. The outer clamping element 48 will pivot counterclockwise until the bead bundle 62 is held securely between the clamping elements 40 and 48.

The rotary fluid motor 34 and the clamping element 40 are designed so that the clamping force available to be exerted on the axially inner surface 68 of the bead bundle 62 is greater than the clamping force which can be exerted by clamping element 48 in response to operation of the linear fluid motor 36. This is to insure that the clamping element 40 will, in its gripping position, always maintain the position predetermined by the set screw 46. It is this consistently assured positioning of the clamping element 40—and the concomitantly accurate positioning of the axial inner surface 68 of each bead bundle 62—which assures the desired linear dimension between the opposed bead bundles.

Figure 4:
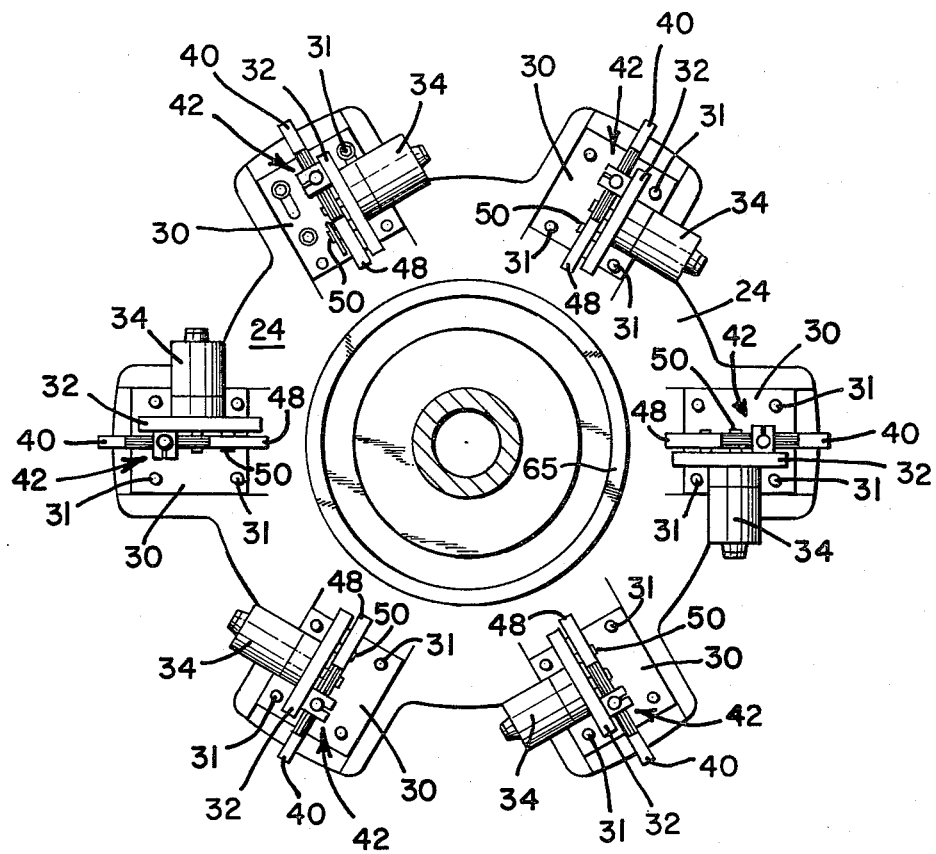
FIG. 4 is a view taken substantially along line 4—4 of FIG. 1 except that the bead gripping mechanisms are depicted in their open position.

Preferably, a plurality of clamping mechanisms 10 are utilized. In the exemplary arrangement depicted (see particularly FIG. 4), six such mechanisms 10 are equally spaced circumferentially of the annular plate 14, and thus also with respect to the assembly drum 74 of the tire building machine 12. Although a lesser number may be satisfactory for some tire sizes, six have been found to be totally adequate to provide sufficient holding and positioning force to insure that the bead bundle will be maintained in the desired position when building a standard sized truck tire. To reiterate, only the headstock end has been shown; the tire building machine 12 also includes a tailstock at which the opposed bead bundle is carried and positioned with a similar platen assembly. Clamping mechanisms 10 such as used at the headstock can also be utilized at the tailstock. The improved clamping mechanisms 10 can be utilized with prior art tire making equipment wherein the tire assembly drum is maintained at a fixed position and the various layers to build up the tire are brought to it. The improved clamping mechanisms 10 can also be used with a tire building system wherein the headstock and drum travel simultaneously on a longitudinal track during the tire building process.

Irrespective of the particular tire building apparatus employed, during the process of building a radial tire a plurality of components will be formed into an assembly 82 on the drum 74 prior to placement of the bead bundles 62. Such components might well include sidewall members, inner liner members, body ply member, etc. When the body ply members and such other basic tire building components as are desired have been disposed on the drum, the fluid cylinder 20 is activated to move the platen assembly 13 carrying clamping mechanisms 10 with annular bead bundles 62 to a bead set position 76 about the assembly 82 on drum 74. The gripping mechanisms 10 and the components on which they are supported have sufficient rigidity that the axially inner surface 68 of the bead bundles 62 will be maintained in a plane 77 which is perpendicular to the longitudinal axis 15 of the tire assembly drum 74. With at least the body ply members and the bead bundles properly positioned with respect to the cylindrical tire assembly drum, the latter is ready for initial expansion and subsequent inflation of the tire components into their toroidal shape. The initial expansion of drum 74 drives the body plies into locking engagement with the radial inner surface 78 of bead bundle 62. Once the bead bundles are fixed to the body plies, the clamping element 40 can be released by retrorotation of the rotary fluid motor 34. The linear force applied by fluid motor 36 can also be relieved from clamping element 48. A spring, not shown, within the linear fluid motor 36 will retract the rod 58, and tension spring 52 will insure that the clamping element 48 is urged away from the bead bundle 62. Initial expansion of the drum 74 will generally force the body ply members to bulge radially outwardly on either side of the bead bundle. The pivotal mounting of the clamping element 48 will permit the apex 80 thereof to ride over, or swing clear, of the bulging body ply member as the platen assembly 13 is axially retracted to clear the drum 74 for continued shaping and assembly of the tire.

From the foregoing description, and the operational discussion, it can be seen that the clamping mechanisms for the bead bundles, when used with a machine which can provide for longitudinal positioning of the clamping mechanisms in a well known manner, will maintain the linear dimension between adjacent bead bundles in a tire band within very close tolerances. The platen assemblies using well known engineering principles, can be positioned to precise positions which will result in a precise position of the inner axial surface 68 of each bead bundle 62. Accordingly, the linear dimension along the cylindrical tire band on drum 74, and between bead bundles, can be accurately maintained. Thus the radial run-out, which normally occurs in a tire when the distance between the bead bundles varies, will not occur. Also, since the bead bundles are accurately located in planes parallel to the plane containing the tire band centerline, the belt plies and tread stock can be accurately located thereby reducing conicity and lateral run-out.

We claim:

1. A bead bundle clamping structure for a tire building machine having a platen assembly and a tire building drum with a longitudinal axis, said bead bundle clamping structure comprising:
   a plurality of clamp means secured to said platen assembly, each clamp means including an inner clamp member adapted to engage the inner axial surface of a bead bundle, an outer clamp member adapted to engage the outer axial surface of a bead bundle, adjustable stop means for establishing the actuated position of said inner clamp member, first and second motor means for operating the inner and outer clamp members, respectively, said first motor means being operable to apply a higher force to said inner clamp member than said second motor means can apply to said outer clamp member;
   said clamp means being selectively operable to position the inner axial surface of a bead bundle clamped thereby in a plane which is perpendicular to the longitudinal axis of the tire building drum, said positioning being determined by the cooperative action of said inner clamp members and said adjustable stop means.

2. A method for accurately positioning the axially facing surfaces of a pair of axially spaced, annular bead bundles with respect to the body ply assembly on a tire building drum, comprising the steps of:
   supporting each bead bundle generally co-axially with the drum;
   moving a plurality of first clamping elements into engagement with the facing surfaces of the bead bundles;
   stopping the engaging movement of the first clamping elements accurately with respect to an axial reference datum;
   moving a plurality of second clamping elements against the opposite axial surfaces of the bead bundles and driving the bundles fully against their respective first clamping elements; and applying a retaining force to said first clamping elements which is greater than the force applied by said second clamping elements against the bead bundles.

3. A method, as set forth in claim 2, comprising the further step of:
moving the clamped bead bundles axially to predetermined bead set positions about the tire assembly while maintaining the axially facing surfaces of the bead bundles in a plane perpendicular to the axis of the tire building drum.

4. A plurality of circumferentially spaced individual clamping mechanisms for engaging and accurately positioning a pair of bead bundles with respect to the body ply assembly on a tire building drum, said bead bundles having axially inner surfaces opposingly facing each other when so positioned, the bead bundles also having axially outer surfaces, means for supporting said clamping mechanisms and means for selectively positioning said supporting means in predetermined locations with respect to the tire building drum, each said clamping mechanism comprising:
first U-shaped and second bar-shaped clamping elements mounted on said supporting means for movement between engagement and release positions;
first fluid motor means for selectively rotating said first clamping element between its engagement and release positions and for maintaining said first clamping element in the engagement position, said first clamping element engaging the axial inner surface of a bead bundle;
reference means to accurately locate the engagement position of said first clamping means;
second fluid motor means having an extensible poston rod for selectively moving said second clamping element linearly between its engagement and release positions, said second clamping element engaging the axial outer surface of a bead bundle;
said means for maintaining said first clamping element in its engagement position applying sufficient force fully to withstand the force moving said second clamping element into its engagement position, thereby assuring a predetermined position for the bead bundle.

5. A clamping structure for positioning a pair of annular beads coaxially with, and spaced axially along, the drum of a tire building machine, comprising:
(a) support means;
(b) first clamp means mounted for movement relative to said support means;
(c) second clamp means mounted for movement relative to said support means;
(d) first and second means to move said first and second clamp means respectively into engagement with the respective axial inner and outer surface of each bead.

6. A clamping structure as in claim 5, wherein said first clamp means is U-shaped and pivoted, and said second clamp means is bar-shaped and axially moveable.

7. A clamping structure as in claim 5, wherein said first and second moving means are fluid motors.

8. A clamping structure as in claim 5, wherein said first moving means provides a higher force level at said first clamp means than said second moving means provides at said second clamp means.

9. A clamping structure as in claim 5, and an adjustable stop means to limit movement of said first clamp means.

10. A clamping structure as in claim 5, and bias means urging said second clamp means in opposition to said second moving means.

* * * * *